Patented Nov. 27, 1951

2,576,513

UNITED STATES PATENT OFFICE 2,576,513

TREATMENT OF CORN STEEP LIQUOR FOR STREPTOMYCIN PRODUCTION

Ralph E. Bennett, Terre Haute, Ind., assignor to Commercial Solvents Corporation, Terre Haute, Ind., a corporation of Maryland No Drawing. Application November 20, 1948,
Serial No. 61,297

7 Claims. (Cl. 195—116)

This invention relates to improvements in processes for producing antibiotics and more particularly to a process of preparing a fermentation medium suitable for use in streptomycin production.

It is well known that streptomycin may be produced in a suitable fermentation medium by the cultivation therein of certain microorganisms of the genus Streptomyces. For example, streptomycin may be produced by the aerobic cultivation of *Streptomyces griseus* in an aqueous solution containing peptone, meat extract and sodium chloride. Inasmuch as meat extract is a somewhat expensive ingredient for large volumes of fermentation media, suitable substitutes have been sought by various investigators. It has been discovered that corn steep water provides a suitable substitute for meat extract in a streptomycin fermentation medium and that high titers of streptomycin may be obtained when the meat extract is replaced wholly or in part by steep water. For example, a medium that has been found to give satisfactory streptomycin titers under commercial fermentation conditions comprises an aqueous solution containing 1 per cent dextrose, 1 per cent corn steep water, 0.5 per cent sodium chloride and 0.5 per cent peptone.

In commercial practice a fermentation medium having the above indicated composition is subjected to sterilization or pasteurization, inoculated with a suitable organism such as *Streptomyces griseus*, and incubated under aerobic conditions for a period of 5 to 7 days. In order to separate the streptomycin, the mycelium of the fermenting organism is removed from the fermented beer by filtration or centrifugation and the streptomycin is separated from the beer in accordance with processes that are well known in the art. These processes may include the step of adsorbing streptomycin on a suitable adsorbent, such as char, fuller's earth, acid-activated clays, etc., followed by elution, readsorption, etc. Solvent extraction may also be employed in the concentration processes to provide the final commercial product in accordance with established procedures.

It has been found that streptomycin prepared by the fermentation of a medium containing corn steep water has a tendency to contain an impurity having the action of a vasodilator when the streptomycin is employed as a therapeutic agent. This impurity having a vasodilating action is believed to be a histamine-like substance which may or may not be histamine itself. Its close chemical relationship to histamine is indicated by the fact that the substance is destroyed by the enzyme histaminase. Commercially prepared streptomycin may be hazardous for therapeutic use if it contains impurities of this character and such impurities are difficult and expensive to remove from commercial streptomycin after it has been prepared.

Accordingly, one object of this invention is to provide a process for the preparation of an antibiotic such as streptomycin which is substantially free from impurities having vasodilating properties.

A further object of this invention is the provision of a process for treating a streptomycin fermentation medium prior to fermentation in order to prevent the carry-over of any histamine-like impurities that may be present into the final streptomycin product.

A still further object of this invention is the provision of a process for separating histamine-like substances or substances having the vasodilating activity of histamine from corn steep liquor.

A still further object of this invention is the provision of a streptomycin fermentation process involving the step of pretreating corn steep liquor employed in the preparation of a fermentation medium in such a manner that histamine or other histamine-like substances will not appear in the final commercial streptomycin product.

Further and additional objects will appear from the following description and the appended claims.

In accordance with this invention it has been discovered that impurities having the physiological action of histamine (i. e., a powerful vasodilator) may be removed from aqueous solutions containing such impurities by contacting the solution with a solid adsorbent comprising an alumina-silica clay. Such clay should be finely divided in nature in order to provide the requisite surface area of contact and to permit ready and complete adsorption of the impurity. Many of the naturally occurring silica-alumina clays may be employed for my process, such as fuller's earth, bentonite, montmorillonite, and the like. If desired, finely divided synthetic silica-alumina clays may be employed. However, silica-alumina clays that are particularly suitable for use in connection with the process of this invention are those of the hydrated type which have been subjected to an acid-activating procedure. A suitable acid-activated clay of this type is one which is now available commercially and sold under the trade name Filtrol. This is a naturally occurring clay of the silica-alumina type which has been acid-activated by processes disclosed in the prior art, such as in Prutzman Patent No. 1,397,113, Funsten Patent No. 2,398,825 or Ewing Patent No. 2,410,436.

In accordance with one embodiment of this invention, a corn steep liquor which normally contains histamine-like substances having a vasodilating action is diluted with water and treated with a quantity of an alumina-silica type clay with constant agitation for a period of several minutes. Thereafter the clay is removed from the solution by means of filtration or centrifugation and the resulting solution is employed in the preparation of a medium for streptomycin fermentation. The usual procedure is followed for compounding the medium by adding such nutrients as dextrose, peptone, sodium chloride and the treated solution of corn steep liquor in the customary percentages to water. After inoculation and after fermentation has taken place in the medium, the mycelium is separated from the beer and the streptomycin in the beer may be concentrated by the usual methods of adsorption, elution, readsorption, re-elution and/or solvent extraction. The resulting product containing streptomycin is substantially free from any histamine-like bodies that may have been present in the initial steep water.

As previously indicated, it is pointed out that histamine itself has not been isolated from steep water and therefore the material in the steep water which is active in causing a blood pressure drop in cats or dogs is only presumed to be histamine. However, such impurities exhibit the same vasodilating effect as does histamine and it is destroyed by histaminase so that it would seem reasonably certain that if it is not histamine, then it is a closely related compound. Therefore, by the terms "histamine" and "histamine-like bodies" as employed in this specification and in the appended claims are meant those substances or impurities which are normally present in corn steep liquor and have substantially the same vasodilating action as does histamine.

In order to demonstrate the advantages that are obtained in practicing this invention, a number of experiments are set forth in the following. It will be understood, of course, that this invention is not to be limited to the specific experiments given but only by the scope of the appended claims.

EXPERIMENT NO. 1

It has been found that the treatment of corn steep liquor by the process of this invention to remove histamine-like bodies does not adversely affect the streptomycin titer eventually obtained in the final fermented product. As a matter of fact, the indications are that the streptomycin yield may be somewhat improved if the steep water is subjected to a treatment in accordance with this invention prior to the fermentation step. This is demonstrated by experimental results summarized in Table I:

Table I

| | Grams of Filtrol per 100 ml. of 2% steep solution | Peak Streptomycin Titer in Final Fermentation Medium (μ/ml.) |
|---|---|---|
| 1 | (Control) 0 | 270-310 |
| 2 | 2.5 | 320 |
| 3 | 5.0 | 350 |
| 4 | 10.0 | 170-400 |

In this experiment four samples of a 2 per cent aqueous steep water solution were prepared and three of them were treated with Filtrol in the amounts indicated in Table I. (No. 1 was the control which was not treated with Filtrol.) The Filtrol was then separated from the solutions by filtration and the four samples were used to make up four 160 ml. batches of fermentation media, each containing tap water and 1 per cent steep water, 1 per cent trypsin-digested casein, 1 per cent dextrose and 0.5 per cent sodium chloride and each being adjusted to a final hydrogen ion concentration corresponding to pH 6.8. The media were then sterilized and inoculated with a 0.5 per cent inoculation of a second 24 hour generation culture of Streptomycin griseus. The peak streptomycin titer in each instance is given in Table I. It will be noted that the streptomycin titer showed a tendency to be higher in the cases of those fermentations wherein the steep water of the media had previously been subjected to the Filtrol treatment.

EXPERIMENT NO. 2

In order to demonstrate the efficiency of an acid-activated alumina-silica clay, such as Filtrol, for the removal of histamine-like bodies from a dilute steep water solution in two different concentrations, the following experiment was carried out: Three 200 ml. portions of diluted corn steep water were prepared, the first and third containing 2 per cent steep water and the second containing 16 per cent steep water, all as indicated in Table II.

Table II

| | #1 | #2 | Control |
|---|---|---|---|
| Steep water g | 4 | 32 | 4 |
| Tap water ml | 196 | 168 | 196 |
| Filtrol g | 4 | 32 | 0 |
| Filter aid g | 4 | 32 | 4 |
| Final pH | 6.5 | 6.5 | 7.3 |
| Histamine equiv. (calc. to μg./g. orig. steep) | 0 | 0 | 400 |

The pH of each of these solutions was adjusted to a hydrogen ion concentration corresponding to pH 7.3 with sodium hydroxide and thereafter 4 grams of Filtrol were added to #1 and 32 grams of Filtrol were added to #2, the third portion serving as a control to which no Filtrol was added. Also to these several portions were added 4, 32 and 4 grams, respectively, of Hyflo filter aid, which is a form of diatomaceous earth (i. e., substantially pure silica) which serves to assist in the subsequent filtration of the resulting solutions. Each solution was stirred for a period of 15 minutes, filtered, and the hydrogen ion concentration tested, the values being indicated in the table. Thereafter histamine assays were run on the resulting filtrates. It will be noted that in both of the solutions which had been treated with Filtrol the histamine activity was reduced to zero.

All of the histamine assays reported in this and the subsequent experiments were run on an anesthetized cat. The carotid artery was cannulated and connected to a manometer. The test solutions were injected into the bared femoral vein and the consequent drop in blood pressure noted and compared to a standard curve prepared from standard histamine solutions.

EXPERIMENT NO. 3

An experiment demonstrating the adsorption of histamine with different quantities of Filtrol is reported in Table III:

Table III

|  | #1 | #2 | #3 | Control |
|---|---|---|---|---|
| Filtrol _____ g.. | 8 | 4 | 2 | 0 |
| Histamine equiv. (found), μg./ml. | 0.3 | 0.6 | 3 | 12 |
| Histamine equiv. (calc. to μg./g. orig. steep) | 3.7 | 7.4 | 37 | 150 |

In this experiment a solution of 8 per cent of corn steep water in tap water was prepared and divided into four 100 ml. aliquots in each of which the hydrogen ion concentration was adjusted with sodium hydroxide to a value corresponding to pH 7.3. Thereafter Filtrol was added to each aliquot in the amounts indicated in Table III, except for the control to which no Filtrol was added. In addition four grams of Hyflo filter aid (i. e., silica) were also added to each aliquot including the control. The solutions were then shaken for a period of 15 minutes and filtered. The equivalent of histamine in micrograms per milliliter for the filtrate of each aliquot is given in Table III. Also the histamine equivalent calculated to micrograms per gram of original steep water is given. It will be noted that an amount even as small as 2 grams of Filtrol per 100 milliliters of 8 per cent steep water was very effective for removing histamine or histamine-like bodies from these solutions. However, improved results were obtained when four or eight grams of Filtrol were employed.

EXPERIMENT NO. 4

This experiment was carried out to determine the relationship of the hydrogen ion concentration of the solution to histamine absorption. In this experiment, six 100 ml. aliquots of 8 per cent corn steep water were prepared and the hydrogen ion concentration of each was adjusted (except for #1 and the control) to the values indicated in Table IV.

Table IV

|  | #1 | #2 | #3 | #4 | #5 | Control |
|---|---|---|---|---|---|---|
| Initial pH | ¹3.9 | 5.5 | 6.5 | 7.5 | 8.5 | ¹3.9 |
| Filtrol _____ g.. | 8 | 8 | 8 | 8 | 8 | 0 |
| Filter aid _____ g.. | 4 | 4 | 4 | 4 | 4 | 0 |
| Histamine equiv. (found) μg./ml. | 0.75 | 0.45 | 0.54 | 1.08 | 7.23 | 39.8 |

¹ As is.

Thereafter 8 grams of Filtrol and 4 grams of filter aid were added to each of the aliquots with the exception of the control. After stirring, the pH values were readjusted to the initial values indicated for each in the table and each aliquot was shaken for 15 minutes and filtered. Thereafter the hydrogen ion concentration of the filtrates from all of the aliquots was adjusted to between pH 6.5 and 7.5. Histamine assays were run as previously indicated and the histamine equivalents were as shown in Table IV. This table indicates that the hydrogen ion concentration of the solution being treated within the range tested has an effect on the completeness with which the histamine-like bodies are adsorbed and that best results are obtained when the hydrogen ion concentration of the solution treated is below about pH 7.5.

EXPERIMENT NO. 5

In the foregoing experiments and discussion primary attention has been directed to the use of an acid-activated hydrated alumina-silica clay, such as Filtrol, for treating corn steep liquor. However, as previously pointed out, other alumina-silica clays which may or may not be acid-activated may be employed to some advantage in accordance with this invention. In order to demonstrate the effectiveness of fuller's earth (a non-acid-activated alumina-silica clay) in this connection, an experiment was carried out which is summarized in Table V.

Table V

|  | #1 | #2 | #3 | Control |
|---|---|---|---|---|
| Initial pH | ¹3.9 | 6.5 | 8.5 | ¹3.9 |
| Fuller's earth _____ g.. | 8 | 8 | 8 | 0 |
| Filter aid _____ g.. | 4 | 4 | 4 | 0 |
| Histamine equiv. (found) | 1.08 | 2.35 | 14.5 | 39.8 |

¹ As is.

In this experiment also several aliquots were prepared from an 8 per cent steep water solution in which the hydrogen ion concentration of each was adjusted to the pH values indicated and each of which (except for the control) was treated with the amounts of fuller's earth and filter aid indicated. The table shows that the histamine equivalent of the solution was markedly reduced when fuller's earth was employed but to a somewhat lesser degree than when Filtrol was employed as is evident from the previous Experiments Nos. 3 and 4.

As indicated above and in accordance with this invention, the clays that are employed to remove the histamine-like bodies from aqueous solutions in accordance with this invention are those of the alumina-silica type and are preferably those of the hydrated type previously activated with an acid. As will be apparent from the foregoing description, pure silica as represented by various types of filter aids is not suitable for adsorbing histamine-like bodies. Likewise it has been found that adsorbent charcoal under the conditions tested is not effective.

In the practice of this invention on a commercial scale, the usual processes for preparing the fermentation medium, sterilization, inoculation, incubation and recovery of the antibiotic may be employed. In accordance with one embodiment and in order to remove the histamine-like impurities from the corn steep water that is employed in making up the media, a solution is prepared containing 8 parts by weight of corn steep water and 92 parts by weight of water. The solution is adjusted to pH 5.5 with sodium hydroxide and treated with 8 parts by weight of an alumina-silica clay and 4 parts by weight of a filter aid. Thereafter the clay and filter aid are removed from the solution by filtration or centrifugation to separate the adsorbed histamine-like bodies and the resulting filtrate is employed for preparing a streptomycin-producing fermentation medium. A suitable medium comprises 1 per cent trypsin-digested casein, 1 per cent dextrose, 0.5 per cent sodium chloride, and 12½ per cent of the treated dilute steep water solution (corresponding to 1 per cent of steep water in the medium), the balance being tap water. The hydrogen ion concentration of the medium is then adjusted to a value of about pH 6.8 with sodium hydroxide.

The resulting medium is pasteurized or sterilized in the usual manner, cooled and inoculated with a 0.5 per cent suspension of a 24 hour second generation culture of *Streptomyces griseus*. The fermentation is allowed to take place under aerobic conditions for a period of about 5 to 7 days at about 24° C. and thereafter the commercial streptomycin product, which is substantially histamine-free, is separated from the mycelia and beer in accordance with the usual practice.

It will be apparent to one skilled in the art that the composition of the fermentation medium may be varied widely both as to kinds and amounts of added nutrients, including the treated steep water. Corn steep water has been specifically mentioned in the foregoing examples, but it will be apparent that any other steep water or water-soluble nutrient which may contain as an impurity vasodilators having the physiological activity of histamine may be treated to remove such impurities.

The amounts of alumina-silica clay employed for the adsorption of such impurities may vary widely, the maximum quantity being dependent upon economic considerations. Generally speaking, the amount of clay employed will be determined by the concentration of the steep water in the dilute solution treated. Best results are obtained, as indicated in Experiment No. 3 above, when the amount of clay employed is greater than about one-half of the amount of steep water present in the dilute aqueous solution treated.

This invention has also been described with reference to streptomycin production by fermentation of a suitable medium with *Streptomyces griseus*. It will be apparent that other streptomycin producing organisms may be employed and that the invention is also applicable in fermentation processes for the preparation of other antibiotics wherein the carry-over of histamine-like bodies into the final product is not desired.

While several particular embodiments of this invention are disclosed above, it will be understood, of course, that the invention is not to be limited thereto, since many modifications may be made, and it is contemplated, therefore, by the appended claims, to cover any such modifications as fall within the true spirit and scope of this invention.

What is claimed is:

1. In the preparation of streptomycin by the aerobic propagation of *Streptomyces griseus* in a medium comprising corn steep liquor, the improvement which comprises contacting the corn steep liquor with a clay-type alumina-silica adsorbent prior to the fermentation step.

2. A process for the preparation of streptomycin which comprises contacting corn steep liquor with a solid adsorbent comprising an acid-activated alumina-silica clay, separating the adsorbent from said liquor, incorporating the thus treated liquor into a nutrient medium, and thereafter fermenting said medium with an organism of the genus Streptomyces.

3. A process for the preparation of streptomycin which comprises diluting corn steep liquor with water, contacting the resulting solution with a solid adsorbent comprising an acid-activated clay of bentonite origin in order to remove vasodilator impurities from said solution, separating said adsorbent from said solution, preparing a fermentation medium containing the thus treated solution and other nutrients, propagating *Streptomyces griseus* in the resulting medium, and separating from the medium streptomycin substantially free from impurities having the physiological properties of histamine.

4. In a process of preparing a fermentation medium for antibiotic production, said medium including corn steep liquor as an ingredient, the step of contracting said corn steep liquor with a solid adsorbent comprising an acid-activated clay of bentonite origin.

5. In a process of preparing a fermentation medium for antibiotic production, said medium including corn steep liquor as an ingredient, the step of contacting said corn steep liquor with a solid adsorbent comprising an acid-activated clay of the montmorillonite type.

6. In a process of preparing a fermentation medium for antibiotic production, said medium including corn steep liquor as an ingredient, the step of contacting said corn steep liquor with a solid adsorbent comprising fuller's earth.

7. A process of preparing a fermentation medium for antibiotic production which comprises diluting a quantity of corn steep liquor with water, adjusting the hydrogen ion concentration of the resulting solution to a value below about pH 7.5, treating the resulting solution with an alumina-silica clay in an amount greater than one-half of the weight of said quantity whereby to adsorb any histamine-like bodies initially contained in said liquor, thereafter separating said clay from the treated solution, and incorporating the treated solution into a fermentation medium.

RALPH E. BENNETT.

REFERENCES CITED

The following references are of record in the file of this patent:

UNITED STATES PATENTS

| Number | Name | Date |
|---|---|---|
| 2,449,866 | Waksman | Sept. 21, 1948 |
| 2,462,597 | Blott | Feb. 22, 1949 |

OTHER REFERENCES

Block, Proc. Soc. Exptl. Biol. & Med. 51 (1942), pgs. 252–3.

Spalton Mfg. Chemist, Prot. Hydrolyrates, Feb. 1947, (167–65h) pgs. 59 to 65.

Martin et al., Arch. Bioch. 12, (1947), pgs. 95–100.